Aug. 23, 1966 R. M. BUCKERIDGE ET AL 3,268,058
SINUOUS CONVEYOR
Filed Dec. 17, 1964 6 Sheets-Sheet 1

INVENTORS.
ROGER M. BUCKERIDGE
BY COLEMAN GYURE
CONRAD J. PICKER
Parker & Carter
ATTYS.

Aug. 23, 1966  R. M. BUCKERIDGE ETAL  3,268,058
SINUOUS CONVEYOR
Filed Dec. 17, 1964  6 Sheets-Sheet 2
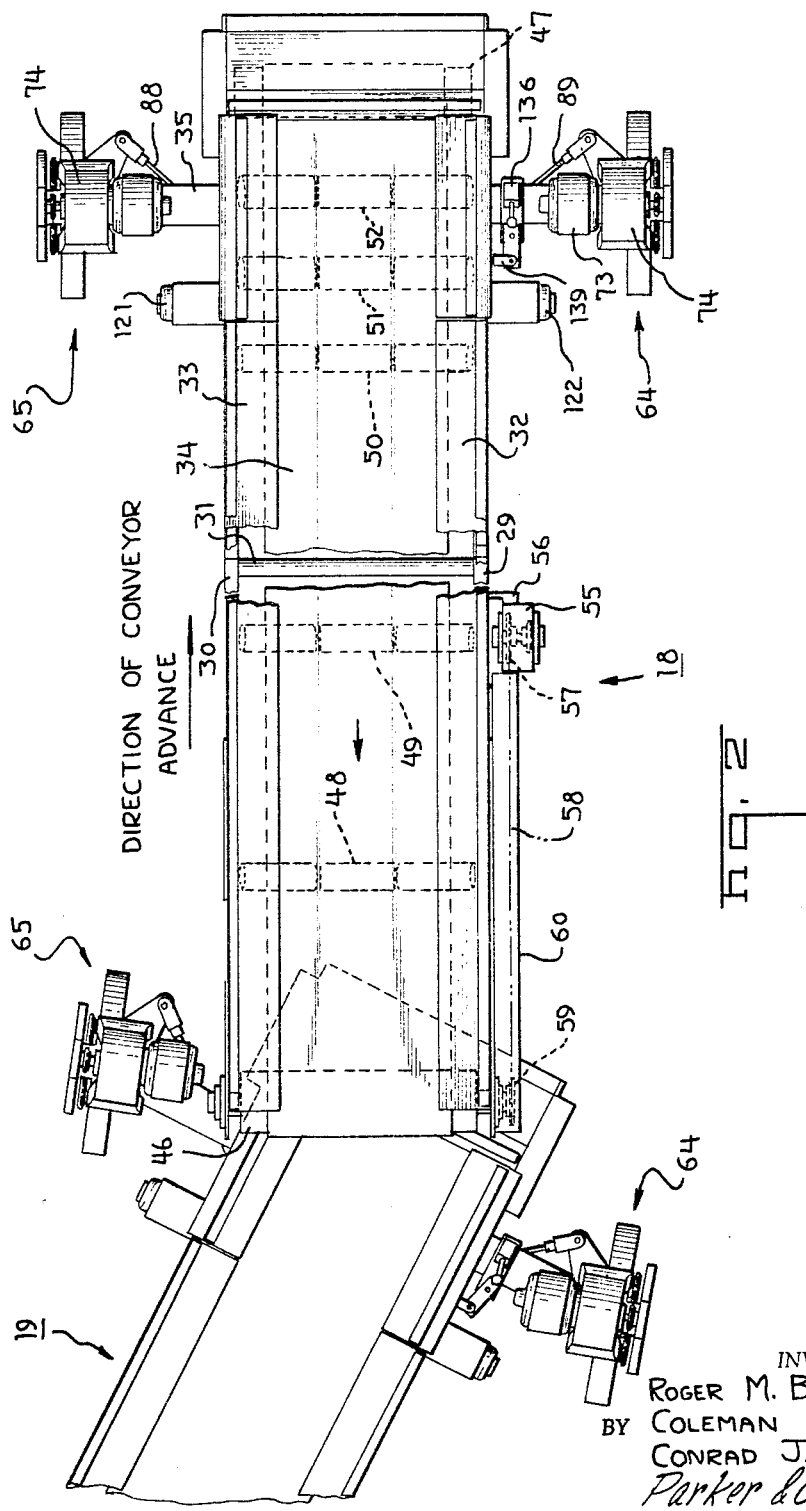
INVENTORS.
ROGER M. BUCKERIDGE
BY COLEMAN GYURE
CONRAD J. RICKER
Parker & Carter
ATTYS.

Aug. 23, 1966    R. M. BUCKERIDGE ETAL    3,268,058
SINUOUS CONVEYOR
Filed Dec. 17, 1964    6 Sheets-Sheet 3
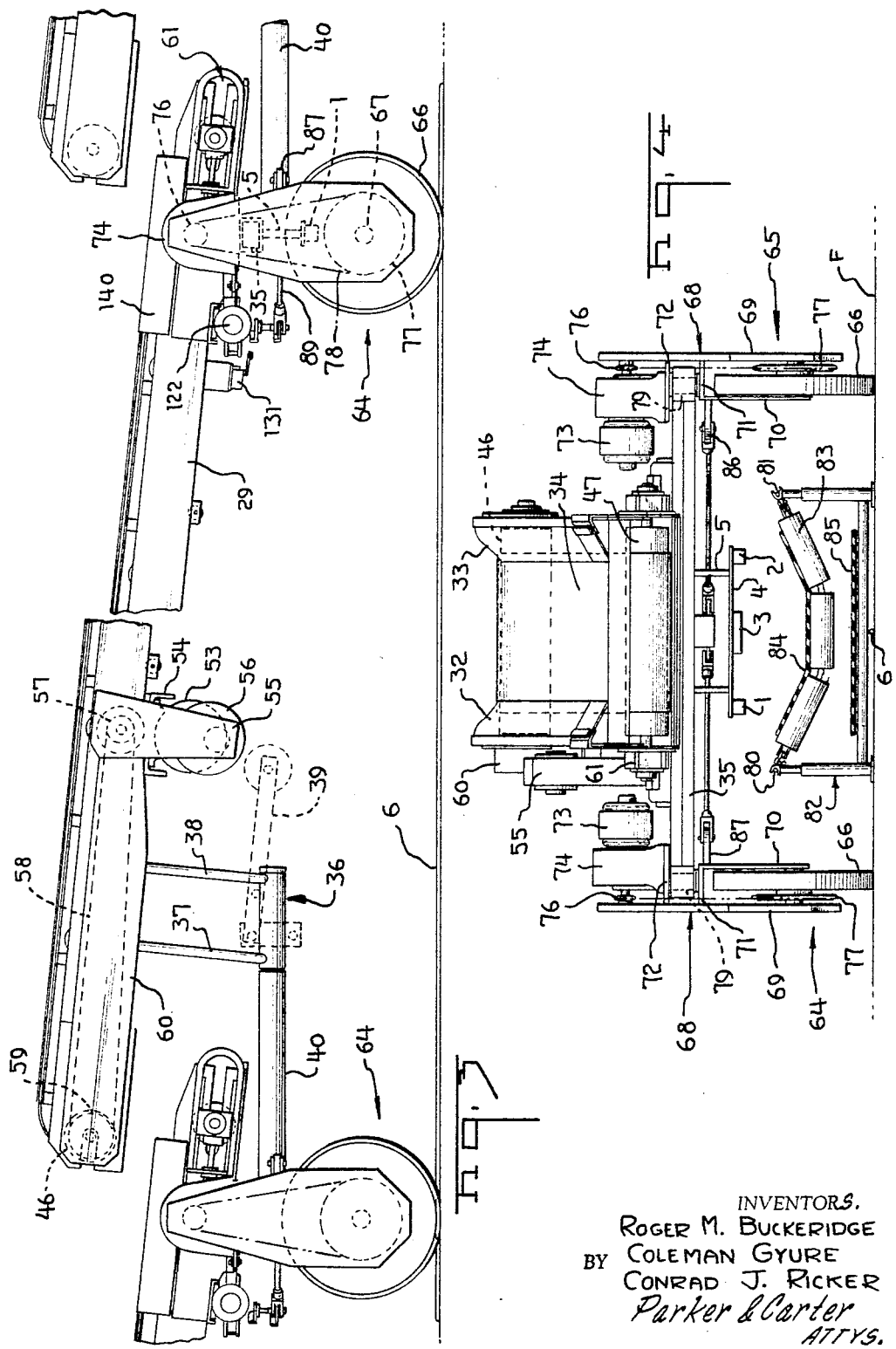
INVENTORS.
ROGER M. BUCKERIDGE
BY COLEMAN GYURE
CONRAD J. RICKER
Parker & Carter
ATTYS.

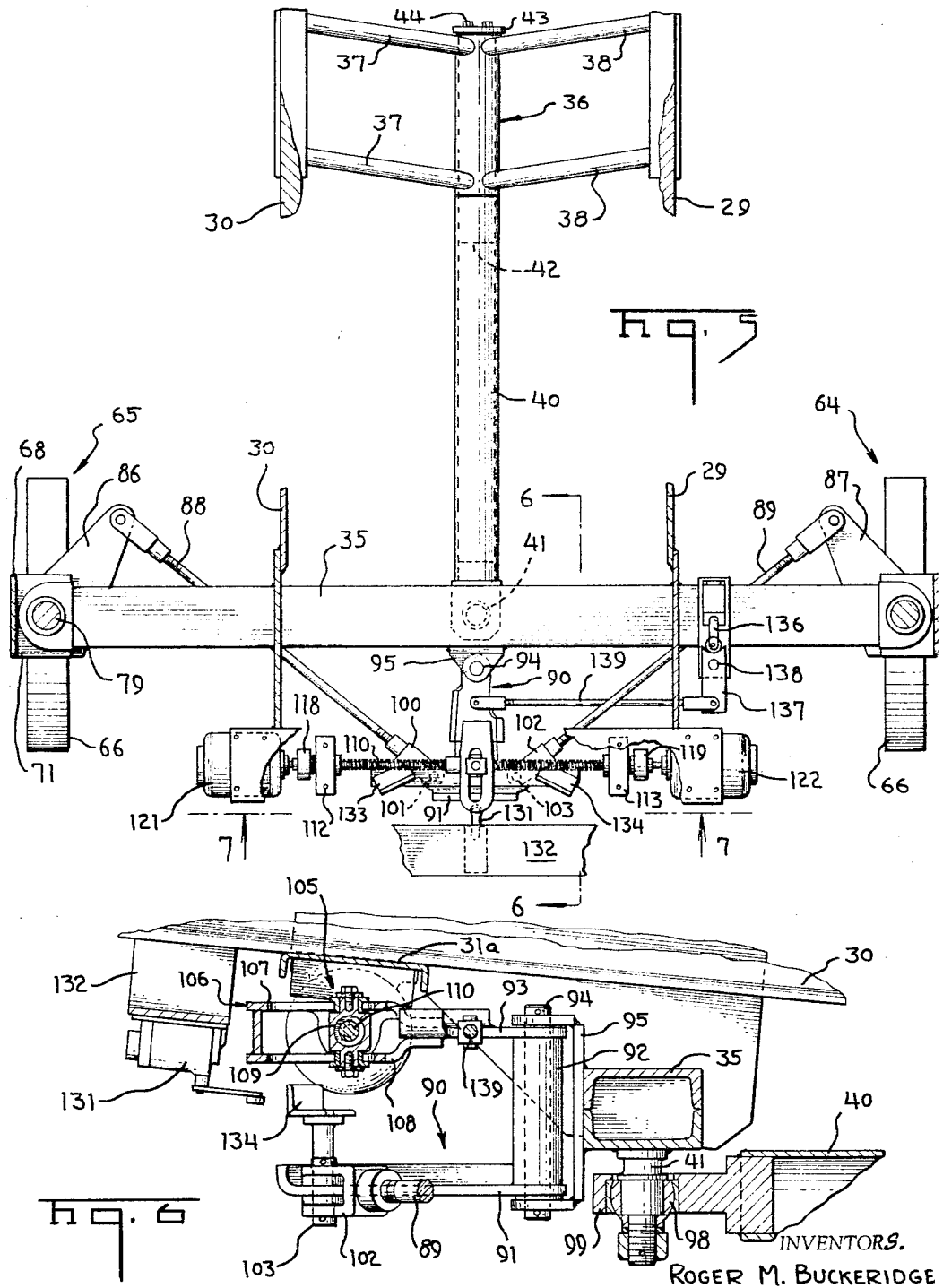

Aug. 23, 1966    R. M. BUCKERIDGE ETAL    3,268,058
SINUOUS CONVEYOR
Filed Dec. 17, 1964    6 Sheets-Sheet 5

INVENTORS.
ROGER M. BUCKERIDGE
BY COLEMAN GYURE
CONRAD J. RICKER
Parker & Carter ATTYS.

INVENTORS.
ROGER M. BUCKERIDGE
COLEMAN GYURE
BY CONRAD J. PICKER
*Parker & Carter*
ATTYS.

United States Patent Office 3,268,058
Patented August 23, 1966

3,268,058
SINUOUS CONVEYOR
Roger M. Buckeridge, Downers Grove, Coleman Gyure, Riverdale, and Conrad J. Ricker, Oak Forest, Ill., assignors, by mesne assignments, to Westinghouse Air Brake Company, Pittsburgh, Pa., a corporation of Pennsylvania
Filed Dec. 17, 1964, Ser. No. 419,114
22 Claims. (Cl. 198—92)

This invention relates to conveying mechanisms and specifically to a self-propelled conveyor capable of forming a curved conveying flow path whereby material may be conveyed along a non-linear flow path in a generally horizontal plane or planes.

There has long been a need for a mobile conveying mechanism which can be conformed to a horizontally non-linear path to thereby carry material around curves. Various proposals have been advanced but no mobile sinuous conveyor mechanism has gained substantial acceptance in the trade to date.

The need is clearly apparent when continuous mining practices in underground mining operations are considered. Typical fields of application would be coal, potash, and salt mining, but this listing is intended to be illustrative only and not exhaustive. For purposes of description, the invention will be described as applied to continuous underground coal mining. In this mining method a machine is continuously advanced into a coal seam for a given distance to form an entry, then withdrawn to form second and third entries (and sometimes more) and cross-cuts; as the miner advances the coal is conveyed from the face to the rear of the machine.

Quite often the mined coal is dumped into a shuttle car which is spotted beneath the discharge end of the miner. This method has the disadvantage that the miner must be shut down when the shuttle car is filled in order to provide time for the shuttle car to move away from beneath the miner and permit a second, waiting shuttle car to move into position to receive the miner output. The full capacity of the miner is therefore not achieved because nearly invariably the shuttle cars cannot keep up with the miner. Furthermore, the shuttle car system is a relatively expensive one.

It is also common practice for the miner to merely discharge the mined coal onto the floor behind the miner. A loader then picks up the coal lying on the floor and deposits it into shuttle cars. This system enables the miner to be run for much longer periods than when the miners discharge directly into a shuttle car. Experience has shown, however, that eventually the miner must be shut down to clear the surge pile on the floor because the loader and shuttle cars invariably fall behind the miner. This system also has the disadvantage that an extra piece of equipment, the loader, is required.

Continuous miners which extend rope conveyors as they advance have also been proposed. This system, however, does not enable the miner to back up and make cross-cuts.

Accordingly, a primary object of this invention is to provide means for and a method of mining whereby materials may be continuously mined and continuously conveyed from the advancing face without interruption of flow along a flow path which is non-linear in a generally horizontal plane or planes, or a vertical projection thereof.

Another object is to provide a sinuous self-propelled conveyor capable of being advanced continuously or in increments in consonance with the advance of a continuous mining operation, or, if desired, behind a loader.

A further object is to provide a self-propelled sinuous conveyor which will conform to a horizontally non-linear path to thereby span the variable distance between a continously advancing mining operation and a loading point, such as a gathering or mother conveyor.

Yet a further object is to provide a sinuous self-propelled conveyor composed of a plurailty of individual units, each discharging onto the other, each unit of which travels the same path as the preceding unit in both advancing and retreating directions.

Other objects and advantages of the invention will become apparent from a reading of the following description of the invention.

The phrase "generally horizontal plane or planes, or a vertical projection thereof" is used to differentiate from a conveyor which may be curved in a vertical plane only, such as a conveyor which rises and descends a hill. While the present conveyor can also conform to a curve in a vertical plane, it has the advantage of simultaneously conforming to a curved center line, or a projection thereof, in a horizontal plane.

The invention is illustrated more or less diagrammatically in the accompanying figures wherein:

FIGURE 2 is a top plan view of the lead unit of the continuous conveyor of FIGURE 1 to a greatly enlarged scale;

FIGURE 3 is a side elevation of a typical intermediate unit in the sinuous conveyor of FIGURE 1;

FIGURE 4 is a view illustrating the relationship of the sinuous conveyor to the mother conveyor to an enlarged scale;

FIGURE 6 is a partial section taken substantially along the line 6—6 of FIGURE 5 to an enlarged scale;

FIGURE 8 is a control circuit for the steering wheels of any one of the conveying units of the sinuous conveyor of FIGURE 1.

Like numerals will be used to refer to like parts throughout the following description of the drawings.

Figure 1:
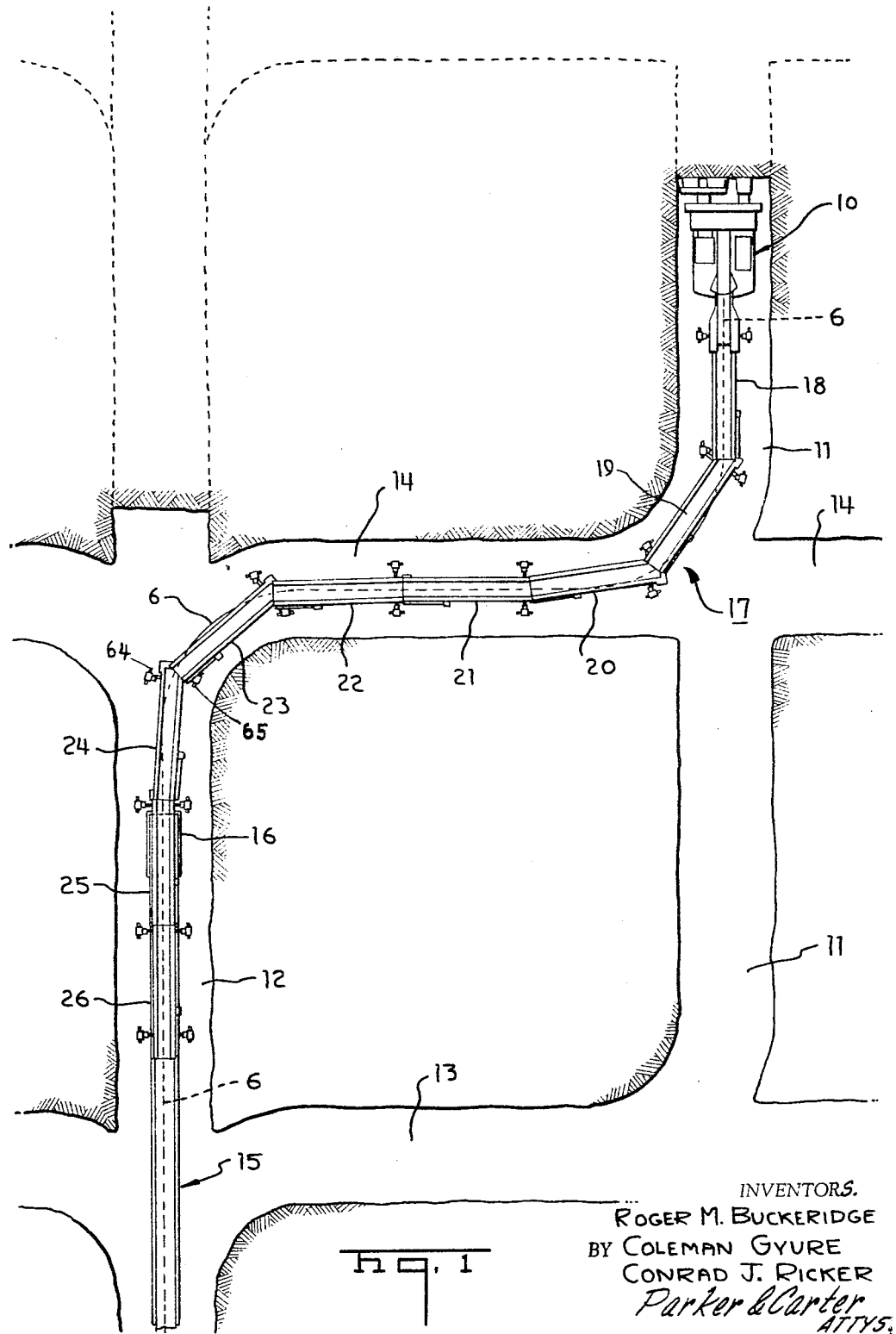
FIGURE 1 is a top plan view, diagrammatic in nature, of the self-propelled sinuous conveyor of this invention operated in a multi-entry continuous mining system.

A continuous miner is indicated at 10 in FIGURE 1. The miner is working in an underground coal mine which consists of a series of generally parallel entries 11 and 12 and a series of cross-cuts 13 and 14. A mother conveyor is indicated generally at 15 in entry 12, the tail or loading end of the conveyor being indicated at 16.

The sinuous self-powered steerable conveyor of this invention is indicated generally at 17. The conveyor consists essentially of a lead unit 18, a series of intermediate units 19–25, and a trailing unit 26. Units 18 through 25 are substantially identical, one to the other, as will appear in greater detail hereinafter. Trailing unit 26 differs from the preceding units primarily by the addition of a second set of wheels. As best shown in FIGURES 1 and 4, the conveyor is positioned to receive coal directly from the continuous miner 10, and the conveyor discharges directly onto the mother conveyor 15.

FIGURE 2 illustrates the lead unit 18 of the conveyor, and FIGURE 3, is typical of any one of units 19 through 25. Since all units except the trailing unit 26 are substantially identical, one to the other, a description of one unit as exemplified in FIGURES 2 and 3 will be sufficient for the description of all.

Each unit includes a frame composed of side members 29, 30 which are maintained a spaced distance apart by a number of cross braces, one of which is indicated at 31 in FIGURE 2. Preferably the side members are channels whose upper flanges extend inwardly, as best seen in FIG- URE 4. Deflector skirts 32, 33 extend inwardly and overlap slightly each edge of a short flexible conveyor belt 34 whose direction of movement is indicated in FIGURE 2.

Figure 5:
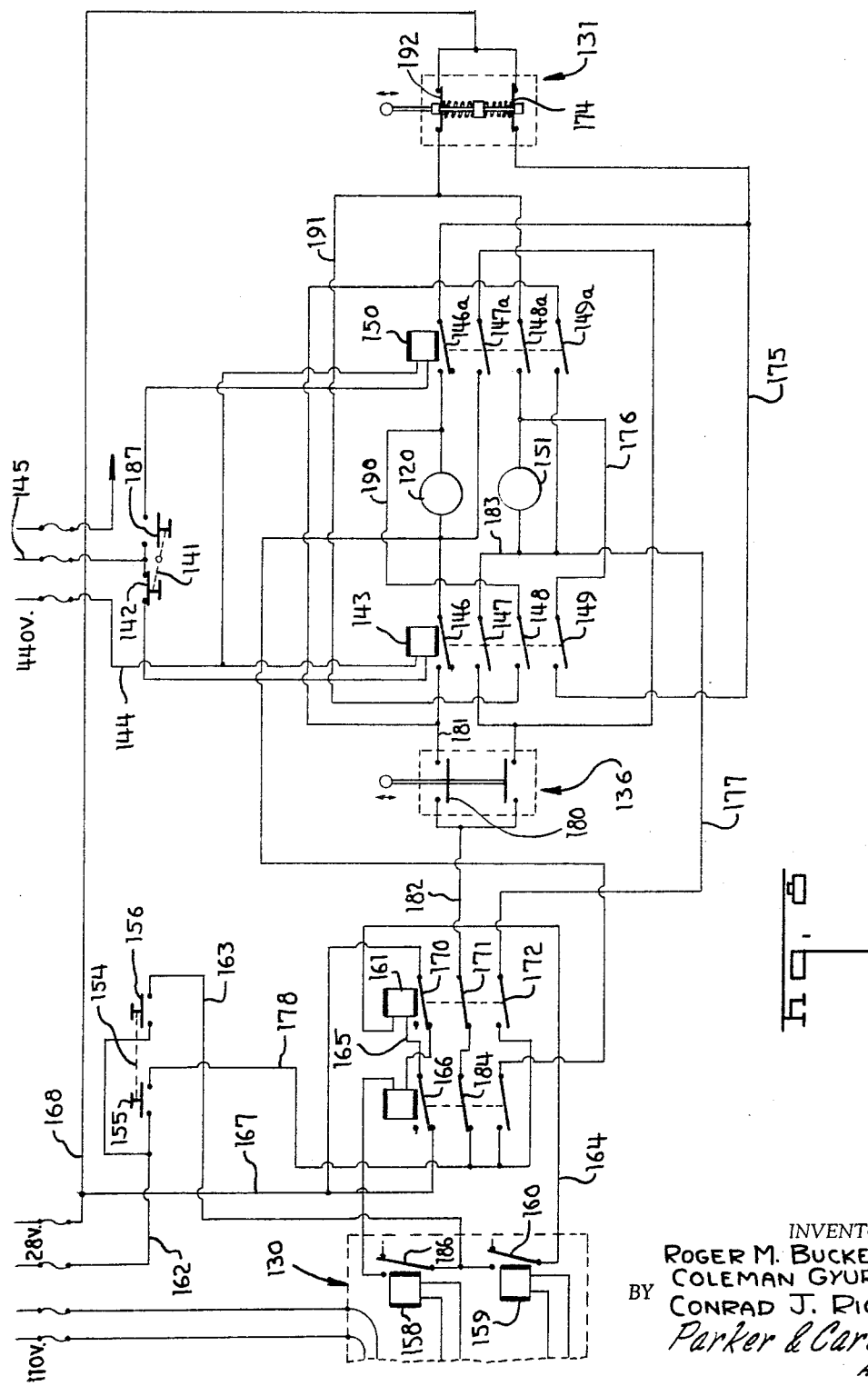
FIGURE 5 is a top plan view of the steering mechanism of a conveying unit with parts broken away for clarity.

The side frame members 29, 30 are welded or otherwise suitably secured to a box frame 35 at the loading end of the conveyor, as best seen in FIGURES 5 and 6. A tubular coupling member 36 is supported from a pair of angled braces 37, 38 which are welded at their upper ends to the side frames 29, 30 and at their lower ends to the coupling member 36. A dolly wheel assembly 39 is indicated in a collapsed position by the dotted lines in FIGURE 3, the dolly being pivoted to member 36.

A connector is indicated at 40, the connector being carried by the next adjacent conveyor unit. Each connector is pivotally connected by king pin 41, shown best in FIGURE 5, to the box section 35. Connector 40, which may be basically a tubular member, carries a connecting rod 42. The external diameter of the connecting rod 42 is received within the short coupling member 36 on the next adjacent unit and the connection is made by means of an end plate 43 which at least extends to the edge of, and preferably overlaps, the periphery of coupling member 36. Bolts 44 or other suitable fasteners connect the end plate 43 into the solid connecting rod 42.

The endless, orbitally movable conveyor belt 34 is supported by head pulley 46, tail pulley 47 and a series of troughing idlers 48–52. Idlers 50, 51 and 52 are closely spaced in the impact area at the tail or loading end of the belt. The belt is driven by motor 53, which is suspended from the cross brace 54. A speed reducer is indicated at 56, the speed reducer driving a sprocket 57. A chain 58 drives sprocket 59, which in turn drives head pulley 46. Safety guards are indicated at 55 and 60. Suitable mechanism for controlling tension in the belt is indicated at 61.

A pair of wheels are indicated at 64 and 65. Each wheel assembly includes a wheel 66 whose axle 67 is supported in a wheel carrying yoke 68, the wheel yoke including side bars 69, 70 and spacer 71. A supporting platform 72 is welded to and extends inwardly from outer bar 69, the platform being located above spacer 71 a distance sufficient to clear box section 35. A wheel drive motor is indicated at 73, the motor being connected to a speed reducer 74 which is bolted or otherwise suitably secured to the mounting or supporting platform 72. The output shaft of the speed reducer carrier a sprocket 76 which drives wheel sprocket 77 by means of chain 78. The entire wheel assembly, including the motor, speed reducer and wheel carrier yoke is pivotally mounted to the box frame 35 by a king pin 79 journalled in the outer end of the box frame.

It will be noted that when the units are assembled, as illustrated in FIGURES 1 and 3, the head or discharge end of each unit is supported by the connecting structure 40, 42 which projects toward it from the next unit.

In FIGURE 4, the relative position of the sinuous portable conveyor with respect to the mother conveyor onto which it discharges is illustrated. It should be understood that the type of gathering or mother conveyor with which the portable conveyor is used does not form an essential part of the invention. For purposes of illustration, a rope side frame conveyor of the type illustrated and described in Craggs and McCann Patent No. 2,773,257 has been shown. The conveyor consists essentially of a pair of rope side frames 80, 81 which are supported at intervals by support structure indicated generally at 82. Troughing idler assemblies 83 are suspended from the ropes at desired intervals, the troughing idler assemblies forming the bed for the conveying reach 84 of a flexible conveyor belt. The return reach 85 may be supported from any suitable structure. When the sinuous portable conveyor is aligned with the mother conveyor, as can best be visualized from FIGURE 4 and the last two units in FIGURE 1, discharge over the head end of the tail unit 26 will be made directly onto the mother conveyor which lies vertically below.

The mechanical components of the steering system for wheel assemblies 64, 65 are illustrated primarily in FIGURES 3, 5, 6 and 7.

Referring first to FIGURE 5, it will be noted that each wheel assembly includes a tie plate 86, 87 which turns with the wheel assembly. A pair of drag links are indicated at 88 and 89, each drag link being pivotally connected at its outer end to an associated tie plate and at its inner end to a steering yoke indicated generally at 90.

Steering yoke assembly 90 includes a lower yoke arm 91, a tubular bight portion 92 and an upper arm 93. The steering yoke assembly 90 is connected to box frame 35 by pin 94 which passes through the bight 92 and is received in the forwardly directed arms of a support bracket 95. From FIGURE 6 it will also be noted that king pin 41 includes a ball joint 98 which is received in adaptor 99, the adaptor in turn being welded to the forward end of connector sleeve 40.

A clevis is carried by the inner end of each drag link 88, 89. Clevis 100 is pivotally connected to yoke arm 91 at 101 and clevis 102 is pivotally connected to yoke arm 91 by pin 103. It will be apparent that as the yoke assembly 90 pivots about pin 94, the wheel assemblies will be simultaneously turned in the same general turning direction. By suitable proportioning of the drag links and tie plates, skew of the wheels can be accommodated, all as is well known in the art.

Figure 7:
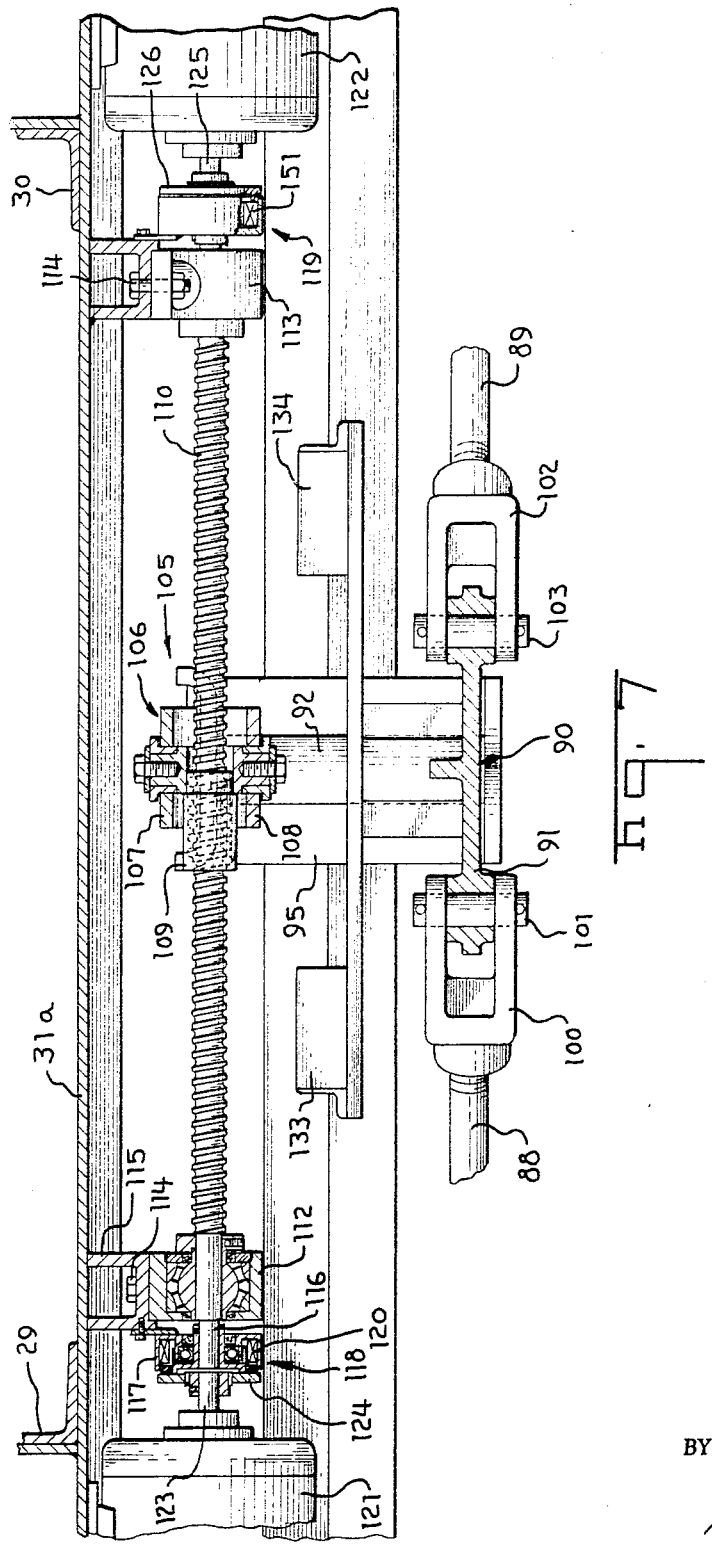
FIGURE 7 is a sectional view taken substantially along the line 7—7 of FIGURE 5 with parts removed for clarity to an enlarged scale.

The mechanical means for pivoting yoke assembly 90 about pin 94 is illustrated best in FIGURES 5, 6 and 7.

The upper yoke arm 93 carries a steering knuckle assembly 105 which consists of a bracket 106 whose upper and lower arms 107, 108, respectively, are welded to yoke arm 93. A ball screw adaptor 109 is slidably mounted in slots in the upper and lower arms 107, 108 of bracket 106, as can best be visualized from FIGURES 5 and 6. Adaptor or housing 109 receives ball screw 110, which for purposes of description may be considered to have a right-hand thread extending its entire length. A plurality of torque transferring balls contained within housing 109 cause relative displacement between the ball screw 110 and bracket 106, and thereby yoke assembly 90, in a well-known manner. As yoke assembly 90 pivots about pin 94, wheel assemblies 64, 65 will be turned along with drag links 88, 89 and tie plates 86, 87.

Ball screw 110 is journalled at its ends in suitable bearings 112, 113, one of which is shown in section in FIGURE 7. The bearings are supported in any suitable manner, such as by bolts 114, from a suspension bracket 115 which in turn is welded or otherwise suitably secured to a transverse structure 31a which is integral with the unit's frame. The end 116 of the ball screw is received in the inner half 117 of a magnetic clutch, a pair of which are indicated generally at 118, 119. Clutch 118 includes a coil 120. A gear of clutch or steering motors are indicated at 121 and 122. The output shaft 123 of motor 121 is received within and rotatable with the outer half 124 of magnetic clutch 118. The output shaft 125 of steering motor 122 is received within and rotatable with the outer half 126 of magnetic clutch 119. When the clutch halves are disengaged as in FIGURE 7, the ball screw 110 will not rotate, even if steering motors 121, 122 are rotating.

When magnetic clutch 119 is energized to couple drive shaft 125 to ball screw 110, rotation of the ball screw will cause the adaptor 109, and thereby the entire yoke assembly 90, to move to the right, as viewed in FIGURE 7. Conversely, when magnetic clutch 118 is energized to thereby couple output shaft 123 to ball screw 110, the adaptor 109, and thereby the yoke assembly 90, will move to the left as viewed in FIGURE 7. These movements assume a right-hand thread on the ball screw 110, as viewed from the right end of FIGURE 7.

The electro-mechanical system for turning ball screw 110 in the appropriate direction is illustrated best in FIGURES 2, 4, 5, 6, 7 and 8.

A pair of control coils 1, 2 and a reference coil 3 are illustrated in FIGURE 4. These coils are secured to a cross bar 4 which is suspended by brackets 5 from box section 35. The coil system is positioned directly and symmetrically above a conductor 6, which in this instance is shown as resting upon the mine floor F. It is quite within the scope of the invention to position the conductor 6 at any other convenient location, such as from the roof or even to one side or the other from the assembly with, of course, suitable and obvious modifications in the reference and control coil system. Conductor 6 may, for example, be a single wire adapted to transmit alternating current. While the conductor could be mounted on insulating supports, it is preferably merely an insulated wire which can be laid loosely on the floor over which the vehicle is to travel. The wire may be connected to any suitable alternating current generator, preferably one generating a relatively low frequency current on the order of 10–20 kc., although the frequency is not critical. For a fuller and more complete description of the electronic circuitry of which the conductor 6 and coils 1, 2 and 3 are integral parts, reference is made to copending application Serial No. 359,108, filed April 13, 1964, now abandoned, and assigned to the assignee of the present invention. That application discloses and claims an electrical guidance system, more particularly a control system, especially adapted for actuating the magnetic clutches 118 and 119 of the conveyor of the present invention. For purposes of convenience, it will be understood that the electrical guidance system disclosed in the aforesaid copending application generates controlled voltages which, when combined with the reference voltage derivable from reference coil 3, controls the magnetic clutches and the wheel steering system. For convenience the circuitry associated with the conductor 6 and coils 1–3 is indicated at 130 in FIGURE 8 which diagrammatically represents a black box containing the circuitry disclosed in the aforesaid copending application.

Additional components of the electro-mechanical steering system are illustrated in FIGURES 2, 3, 5, 6 and 7.

A limit switch which functions to terminate rotation of the ball screw 110 after a predetermined relative movement between the ball screw and adaptor housing 109 has occurred is indicated at 131. The switch is mounted from a suspension bracket 132 welded to the underside of the unit frame. A pair of strikers is indicated at 133, 134, the strikers being carried by lower yoke arm 91. The strikers are adjustable and are aligned with the switch 131 so as to actuate the switch upon reaching a predetermined limit of travel. Thus, for example, referring to FIGURE 5, and assuming steering motor 122 is turning ball screw 110 so that the yoke assembly 90 is moving counterclockwise, striker 133 is so positioned that it will trip switch 131 and thereby deenergize clutch 119. Deenergization of the clutch stops rotation of the ball screw before the yoke assembly swings to a point at which it would over-steer or the yoke assembly would physically contact the ball screw 110.

Another limit switch is indicated at 136. This limit switch is controlled by a lever 137 which is pivoted to the switch mounting bracket at 138. The lever 137 in turn is actuated by a control link 139 whose inner end is pivoted to upper yoke arm 93 by a clevis or other suitable connector, as shown best in FIGURES 5 and 6. The function of this limit switch is to return the wheels to a straight position when an on course signal in indicated. In effect, this limit switch establishes a neutral position for the wheels.

The use and operation of the invention is as follows:

The invention may be best understood in connection with an underground continuous mining operation. Referring first to FIGURE 1, a continuous miner 10 is shown cutting an entry 11 into a coal seam. The conductor or reference wire 6 extends rearwardly from the miner to cross-cut 14 and then into entry 12, the conductor underlying mother conveyor 15 and being connected to a suitable source of power current, preferably of relatively low frequency.

The portable conveyor 17 of this invention consists of a plurality of interconnected, individually steerable, self-tramming conveyor units, each of which is capable of automatically following the refence wire 6. The conveyor is thereby able to form a material flow path having a curved configuration in a horizontal plane or planes. Each unit, though connected to a preceding or succeeding unit or both, is steered independently of all other units so there is no tendency for succeeding or preceding units to "cut corners." So long as the reference wire 6 is not disturbed, each conveying unit will be steered from it independently of any steering influences from adjacent units.

In operation, an operator at a control station maintains the lead unit 18 in a position to receive the coal or other mined material directly from the miner 10. The coal is discharged onto the lead unit 18 at its low loading end, as may best be seen from FIGURE 3, and moved to the higher discharge end of the unit on the conveyor belt 34 which is driven from head pulley 46. As the excavated or mined material goes from the tail to the head end of each unit, it is elevated a distance sufficient to provide a clearance beneath the discharge end for the tail end of the next unit. This relationship is illustrated best in FIGURE 3. If desired, each unit may have sideboards 140 extending outwardly at the loading end of the unit to prevent spill-over.

Each conveyor unit has a pair of self-powered steerable wheels at its tail or advancing end and the motor system may be so controlled that all units move simultaneously. Each unit is supported from its succeeding unit by the connector system, illustrated best in FIGURES 3 and 6 with the exception of the head unit 26 which is supported by a pair of wheels at each end thereof.

The steering action can be best visualized from a description of a turning movement and for this purpose reference is made primarily to FIGURES 1, 2, 5 and 8.

Assume, for example, an individual conveyor unit has drifted from a position in which it is centered above conductor 6 to a position in which the conductor has been relatively displaced to the right, as viewed in an advancing direction. In other words, the unit has "drifted" to the left. Such a situation would be illustrated, for example, by unit 24 in FIGURE 1. It is then necessary to cause the wheels 64, 65 to turn to the right.

Refer now to FIGURE 8. Forward and rearward movement of the conveyor units is controlled by switch 141. To move in a forward direction, the operator actuates switch 141 to move contact 142 into the illustrated position of FIGURE 8. The closure of contact 142 completes a circuit through coil 143, which includes lines 144 and 145. Energization of coil 143 closes normally open switches 146, 147, 148 and 149. Coils 143 and 150 are in the motor circuits to the tramming motors 73.

Since switches 146–149 and corresponding switches 146a–149a are in the circuits associated with the right clutch coil 151 and the left clutch coil 120, respectively, no steering action can occur unless one or the other of coils 143 or 150 is energized.

An Off–On switch for the electrical guidance system circuitry is indicated at 154. This switch controls a pair of contacts 155 and 156. The operator moves Off–On switch 154 from its illustrated, normally open position to a closed position in order to connect the electrical guidance system indicated generally at 130 (and illustrated and described in more detail in the aforesaid copending application) to the magnetic clutch coils 120 and 151.

When the conductor wire 6 is centered under reference coil 3, as illustrated in FIGURE 4, and by unit 25 in FIGURE 1, limit switch 136 is open as indicated in FIGURE 8. Limit switch 131 is closed, as indicated in FIGURE 8, and will remain closed so long as strikers 133, 134 remain out of contact with the switch actuation lever.

Now, as the unit drifts to the left with respect to the conductor wire 6, as typified by the relative position of the conductor and unit 24 of FIGURE 1, the following occurs:

The electrical guidance system of the aforesaid copending application generates a current in either of coils 158 or 159 of unit 130, but not both. Assume, for example, that drift to the left energizes coil 159. Switch 160 is thereby closed. Closure of switch 160 completes a circuit through coil 161, which may be traced through line 162, switch 156, line 163, switch 160, line 164, the coil 161, line 165, normally closed switch 166, line 167 and line 168.

Energization of coil 161 opens switches 170 and 171 and closes switch 172.

Closure of switch 172 completes a circuit through coil 151 which controls the clutch associated with motor 122 and which may be traced as follows:

Line 168, switch 174, line 175, switch 149, line 176, coil 151, line 177, switch 172, line 178, switch 155 and line 162.

Energization of coil 151 actuates the magnetic clutch which causes ball screw 110 to rotate in the appropriate direction to turn the wheels 64, 65 to the right.

Shortly after coil 151 was energized and the wheels 64, 65 began turning, contact 180 in limit switch 136 closed the connection between lines 181 and 182. This movement occurred as link 139 of FIGURE 5 rotated to move actuator 137 about pivot 138 to thereby control the striker of limit switch 136. Closure of the switch between lines 181 and 182 has no immediate effect, however, because switch 171 has been moved to an open position as previously mentioned.

As the conveyor unit moves back to a centered position above the conductor wire 6, the reference signal in coil 159 decays. When the signal is no longer effective to cause current flow through coil 159, switch 160 opens. Coil 161 is immediately deenergized, and the switches 170, 171, 172 are returned to their illustrated FIGURE 8 position. Opening of switch 172 deenergizes coil 151 and rotation of the ball screw ceases.

In order to prevent a continual off and on operation of switches 160 and 186, guidance system 130 may be adjusted so that the reference signal in coils 158 or 159 is cut off when the conveyor unit approaches to within a predetermined distance of a centered position. The guidance system is adjustable (as more fully explained in the aforesaid copending application) to enable the switches 160 or 186 to open when the conveyor unit approaches to within any desired, adjustable distance from a centered or neutral position. Purely by way of example, a variation on the order of about 3–4 inches to either side of a neutral position may be employed, but these figures are in no sense limiting since the range may vary widely.

When the conveyor unit reaches the limit of the predetermined adjustable range of permitted movement from a neutral or centered position, and the appropriate one of switches 160 or 186 opens as above described, the wheels will be in a turned position with respect to the longitudinal axis of the conveyor unit. In order to straighten the wheels so that the unit is not over-steered to the other side of the centered position, switch 136 and its associated circuitry is operated. The following specific description of operation will illustrate the functioning of switch 136.

Assume forward coil 143 is energized. Upon energization of coil 159, switch 160 closes and a circuit is formed through coil 151, including switch 172; switches 170 and 171 are opened, all as above described. The instant before energization of coil 159, switch 180 is in its illustrated FIGURE 8 position. Very shortly after energization of coils 159 and 151, switch 180 is mechanically moved into contact with lines 181 and 182 by the operation of linkage, 139, 137 and 138 which moves with yoke 90. No current flows through switch 180, however, because switch 171 is open.

When the conveyor unit returns to the outer limit of the adjustable range of deviation from a central position and switch 160 opens, the current through clutch coil 151 ceases since coil 161 is de-energized and switch 172 opens. Rotation of ball screw 110 in the direction associated with clutch coil 151 thereby ceases.

De-energization of coil 161 returns switch 171 to its illustrated FIGURE 8 position. Closure of switch 171 completes a circuit through clutch coil 120 which comprises line 162, switch 155, line 178, switches 184, 171, line 182, switch 180, line 181, switch 146, coil 120, line 190, switch 148, line 191, switch 192 and line 168. Energization of clutch coil 120 causes engagement of the opposite clutch and the ball screw 110 is rotated in the opposite direction thereby swinging yoke 90 back to the centered position of FIGURE 5. When the wheels reach a centered or straight ahead position, switch 180 is mechanically opened by linkage 139, 137 and 138, which has returned to its FIGURE 5 position, and coil 120 thereby is de-energized. Rotation of the ball screw 110 stops with the wheels straight ahead and the conveyor unit in the desired relationship to the conductor 6.

Limit switch 131 remains in the illustrated FIGURE 8 position so long as the relative movement between the steering yoke assembly 90 and the ball screw 110 does not bring strikers 133, 134 into engagement with the switch actuator. Should striker 133, for example, strike actuator 131 as yoke assembly 90 swings counterclockwise as shown in FIGURE 5, switch 174 will be opened, thereby de-energizing clutch coil 151.

It will be understood that should the conveyor unit drift to the right with respect to the conductor wire 6, switch 160 will remain in its illustrated position and switch 186 will close upon energization of coil 158. It will at once be apparent to one skilled in the art from FIGURE 8 that switch 186 controls primary actuation of magnetic clutch coil 120. Since the mode of operation will be practically the same as just described in connection with a leftward drift, further description is not necessary.

It will also be understood by those skilled in the art that the steering system functions essentially the same whether the operator runs the conveyor unit in the forward or rearward direction. That is, in the event the operator wishes to move the portable conveyor 17 out of the entry 11 into entry 12 for any reason, such as the completion of a cut by a continuous miner 10, the operator merely actuates the forward-reverse switch 141 to open switch 142 and close switch 187. Closure of switch 187 then actuates coil 150 and the movements will occur in the reverse position.

It will also be understood that steering motors 121 and 122 are preferably continuously operated. That is, so long as switch 142 or 187 is closed, the steering motors 121 and 122 will operate. So long as the magnetic clutches 118 or 119 are de-energized, however, the steering motors will have no steering effect because ball screw 110 will not be actuated. The magnetic clutches merely couple the ball screw to the continuously turning output shaft of the appropriate steering motor.

Whereas a preferred embodiment of the invention has been illustrated and described, it should be realized that there are many modifications, substitutions and alternations thereto within the scope of the following claims.

We claim:

1. A sinuous mobile self-powered steerable conveying apparatus comprising:

a series of pivotally interconnected cascading conveyors; one end of each conveyor being ground-supported by a pair of pivoted wheels, a reversible electric tram motor individually connected directly to each wheel, an orbitally movable conveyor belt driven from a power source, steering means including a steering linkage associated with each wheel;

a steering screw connected to both linkages and effective, when rotated in one direction or the other, to steer each pair of wheels to right or left;

steering motor means;

first and second steering clutches connected between the steering motor means and the screw and effective when individually actuated to rotate the screw in opposite directions;

steering clutch control means selectively operable to actuate either of said clutches individually to rotate the steering screw in a selected direction.

2. The steerable conveying apparatus of claim 1 further including a control circuit which energizes the steering motor means to run continuously while the tram motor means is energized, and to de-energize the steering motor means when the tram motor means is de-energized.

3. The steerable conveying apparatus of claim 1 further including a control circuit effective to simultaneously energize and de-energize the tram and steering motor means.

4. The steerable conveying apparatus of claim 1 in which the control circuit includes means for de-actuating the clutches when the wheels are turned to straight ahead position.

5. The steerable conveying apparatus of claim 1 in which the control circuit includes means for deactuating the clutches when the wheels are turned to an end limit in either direction.

6. The steerable conveying apparatus of claim 1 in which the control circuit includes an individual steering motor for each clutch.

7. A cascade conveyor comprising:

individual conveyor sections each having an endless conveyor means extending longitudinally thereof;

ground engaging means for each of said sections upon which the conveyor can be moved over a mine floor;

drive means for each ground engaging means;

connecting means joining each section with at least one other section, said connecting means allowing sections to articulate in both horizontal and vertical planes;

individual steering means for each of said ground engaging means, including a signal sensing means controlling a pair of clutches;

a steering screw having each end coupled to one of said clutches;

a pair of continuously running motors each providing power to one of said clutches;

said signal sensing means engaging one of said clutches to rotate the steering screw in a direction to bring the conveyor section back on course when it has departed therefrom;

said course being defined by a signal carrying wire, stretched along a predetermined path.

8. A self-propelled sinuous conveyor, said conveyor including, in combination:

a plurality of conveying units, each of said conveying units having a conveying mechanism thereon, said units being interconnected in flexible relationship one to the other to thereby enable the units to form a conveying flow path of non-linear configuration in a horizontal plane or planes, power means for propelling the conveyor, and means for steering each conveying unit in response to a control signal derived from an electric signal emitted from a path defining signal emitting source.

9. The self-propelled sinuous conveyor of claim 8 further characterized in that the path defining signal emitting source is located in general vertical alignment with the nominal path of the conveyor.

10. The self-propelled sinuous conveyor of claim 9 further characterized in that the path defining signal emitting source is located on the surface over which the conveyor moves.

11. The self-propelled sinuous conveyor of claim 8 further characterized in that the path defining signal emitting source is an antenna wire.

12. The self-propelled sinuous conveyor of claim 8 further characterized in that the means for steering each conveying unit includes:

a pair of steering wheels actuated by a steering linkage, and steering motor means being operable to actuate the steering linkage upon reception of a signal generated in response to displacement of the conveying unit at greater than a predetermined distance from the signal emitting source.

13. The self-propelled sinuous conveyor of claim 12 further characterized in that the steering motor means includes:

an actuator means for moving the steering linkage, a steering motor, and means for coupling the steering motor to the actuator means to thereby actuate the steering linkage, and an electric control circuit operable in response to a signal derived from the signal emitting source for actuating the coupling means.

14. The self-propelled sinuous conveyor of claim 13 further characterized in that the electric control circuit includes means for deactuating the coupling means when the wheels are turned to a straight ahead position.

15. The self-propelled sinuous conveyor of claim 13 further characterized in that the electric control circuit includes means for deactuating the coupling means when the wheels reach a predetermined limit of turn in either direction.

16. The self-propelled sinuous conveyor of claim 13 further characterized in that the actuator means includes a threaded member having a thread of constant turn from end to end, and the steering motor means includes a pair of motors arranged to rotate the threaded member in opposite directions to thereby actuate the linkage in opposite directions.

17. The self-propelled sinuous conveyor of claim 13 further including means for actuating one or the other of said steering motors in consonance with displacement of the conveying unit to one side or the other of a reference point.

18. The self-propelled sinuous conveyor of claim 8 further characterized in that the power means includes a tramming motor for each conveyor unit and means for actuating all of said tramming motors simultaneously whereby each conveyor unit is self-propelled.

19. A control system for coupling and uncoupling a steering linkage actuating clutch of a vehicle comprising:

a control signal generating means operated from a signal emitting source from which the vehicle position is controlled, a first circuit having a control signal responsive switch therein, and a connecting switch actuator, said switch being closed by said control signal generating means operated from the signal emitting source, and a second circuit having a steering clutch coil therein, and a connecting switch, said connecting switch being closable to complete the second circuit upon actuation of the connecting switch actuator in the first circuit, to thereby couple the steering linkage actuating clutch.

20. The control system of claim 19 further including:
a safety switch in the second circuit,
said safety switch being operable to de-energize the steering clutch coil upon physical displacement of the steering linkage past the predetermined position in one steering direction.

21. The control system of claim 19 further characterized in that the control signal responsive switch is opened by the control signal generating means when the steering linkage reaches the limits of a range of deviation from a zero position when moving in another steering direction, and further including:
a third circuit having a bypass switch therein which is closed upon opening of the control signal responsive switch to complete a bypass circuit including the steering clutch coil to thereby maintain the steering clutch coil energized until the steering linkage reaches zero position.

22. The control system of claim 21 further including:
a cut-out switch in the third circuit, and
mechanical means for opening the cut-out switch and thereby de-energizing the steering clutch coil upon movement of the steering linkage to zero position.

References Cited by the Examiner

UNITED STATES PATENTS

| | | | |
|---|---|---|---|
| 2,661,070 | 12/1953 | Ferrill | 180—77 |
| 2,798,587 | 7/1957 | Bergmann | 198—82 |
| 3,128,840 | 4/1964 | Barrett | 180—77 |

EVON C. BLUNK, *Primary Examiner.*

R. AEGERTER, *Assistant Examiner.*